March 17, 1964 F. R. EBERL 3,125,009
COMPOUND BEAM STRUCTURE
Filed Jan. 26, 1960 5 Sheets-Sheet 1
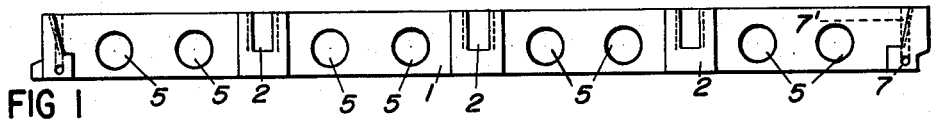
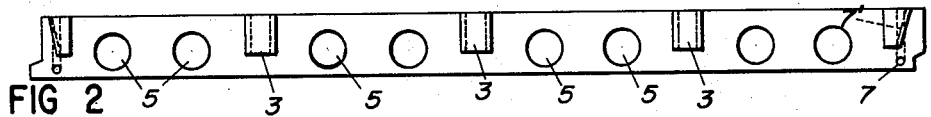
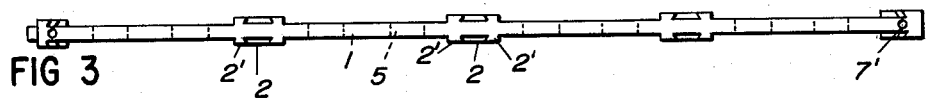
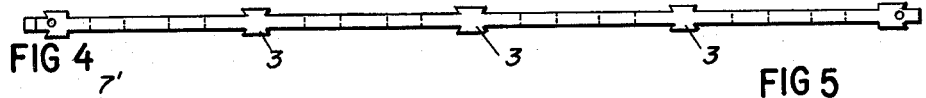
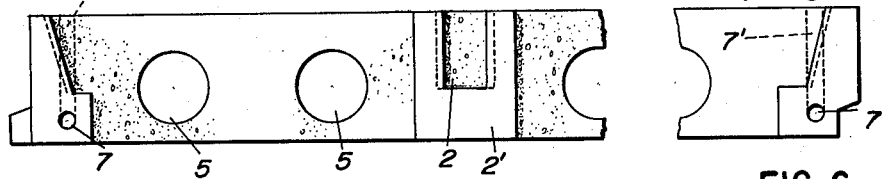
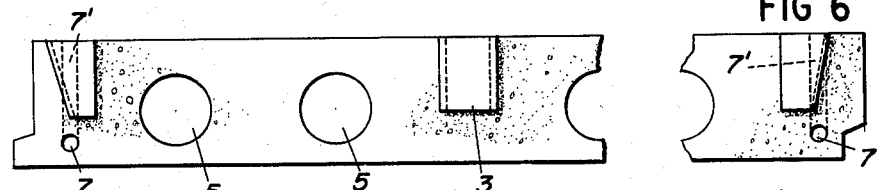
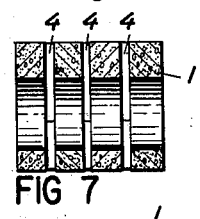
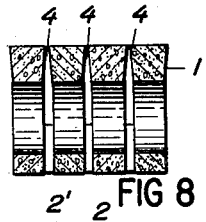
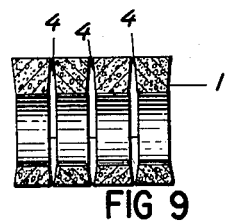
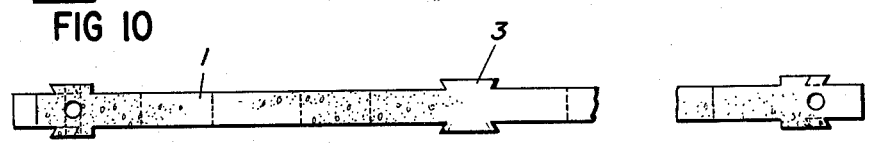
*Franz Rudolph Eberl*
INVENTOR
BY *Wenderoth, Lind & Ponack*
ATTORNEYS

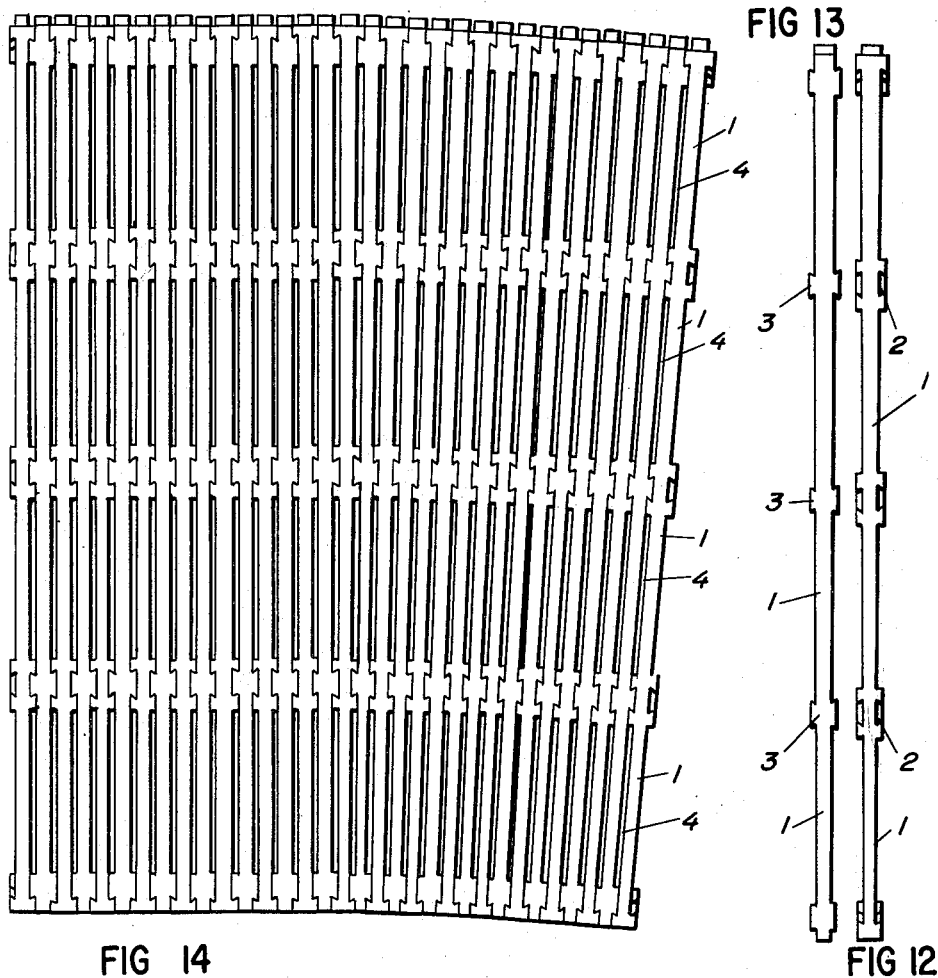

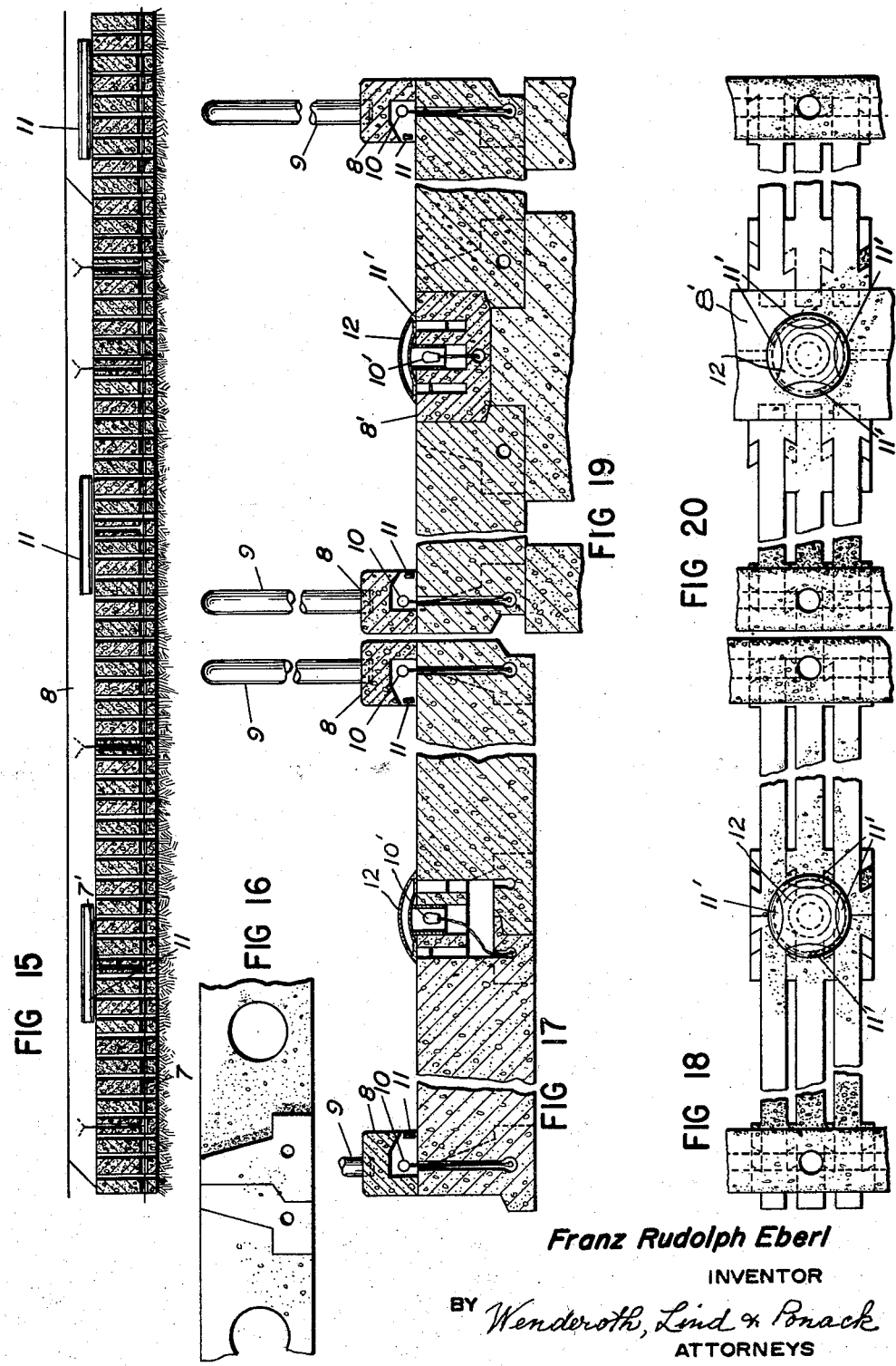

Franz Rudolph Eberl
INVENTOR

March 17, 1964 F. R. EBERL 3,125,009
COMPOUND BEAM STRUCTURE
Filed Jan. 26, 1960 5 Sheets-Sheet 5

Franz Rudolph Eberl
INVENTOR

BY Wenderoth, Lind & Ponack
ATTORNEYS

United States Patent Office 3,125,009
Patented Mar. 17, 1964

3,125,009
COMPOUND BEAM STRUCTURE
Franz Rudolf Eberl, Brockmanngasse 87,
Graz VI, Styria, Austria
Filed Jan. 26, 1960, Ser. No. 4,789
7 Claims. (Cl. 94—4)

The present invention relates to the construction of carrying structures, tread surfaces from beams placed on edge or from prefabricated compound beams comprising two kinds of elements.

An object of the invention is to provide an assembly of connected beams wherein the beams are placed on edge and are located adjacent one another at approximately the same level.

A further object of the invention is to provide on the beams laterally extending connectors positioned at their ends and also intermediate said ends, said connectors comprising cavities which are preferably of wedge or dovetail shape extending in the longitudinal direction of the beams which have at the bottom thereof a supporting face to cooperate with projections or extensions provided upon adjacent beams which projections or extensions are located in said cavities.

A further object of the invention is to provide connectors between adjacent beams so that said beams are spaced from one another.

A still further object of the invention is to taper the beams so that the spacing between said beams is tapered preferably towards the upper and/or lower edges of the beams.

The invention enables the construction of frost-resisting, dry roads provided with edge beams, underground drains and fog lighting from prefabricated beams comprising two kinds of elements and of appertaining edge beams provided with lighting elements etc.

The road raft constructed according to the invention is characterized in that it consists of a plurality of compound beams comprising two kinds of elements, which beams are placed in a geometric pattern transversely to the road axis and are connected to edge beams, drains and inspection wells and the lighting system to provide a dry and safe roadway.

The road raft may be simply and easily placed on any prepared and rolled subgrade, even without a base course. It is also possible to place the raft on strip foundations. The beams or elements are arranged to interengage, locked against displacement and tilting and form slots between the spaced elements. The compound beams have circular openings. The surface water and any underground water which has risen to the surface will trickle away through this raft and is further drained away through the tubular drain openings which discharge in drain manifolds at points spaced in dependence on the position and downgrade. Forming the drain ducts, these round openings in the beams may be cleaned and freed from mud from the inspection wells by means of remotely controlled devices or by flushing. These ducts may also incorporate heating conduits or remotely controlled electric heating devices for thawing any ice formed from snow sludge (another formation of ice is prevented by the raft). The inspection wells being easily accessible, the electric terminal boxes for the low-voltage lighting and plugs for the remotely controlled heating devices are also incorporated in these wells. The lighting may also be centrally controlled from any desired stations or poles.

Road raft in the case of a poor subgrade: The system of compound beams imparts a certain resiliency to the road raft and compensates subgrade differences and is consolidated by becoming embedded in softer subgrade (as in the case with a corduroy road). The suitably provided reinforcements of the compound beams bridge also any cavities formed in the subgrade. These cavities will be filled in the course of time by the sand entrained in the water discharged through the drain ducts. Any sand or soil which may have been forced into the raft ducts will be entrained and carried away by the water in the case of heavy rainfall. If there is no natural cleaning the raft must or may be cleaned from the wells. In the case of a highly varying subgrade the road raft may also be placed on strip foundations.

The road raft is constructed to form a single- or multi-lane roadway. For the curves, special elements or compound beams are made which correspond to the required curvature. These special elements or compound beams correspond to those of the system described hereinbefore but the beams are tapered. In the case of two- or multi-lane roads the joints are also held against rising.

The beam elements are made, as a rule, for one-lane roads in a width of 3.50 meters. Two aligned beams form the two-lane road 7 meters wide. The elements may also be made for wider or narrower roads. The two-lane road is bounded by edge beams or border pillars plugged into the road raft. The edge beams and border pillars have light slots on the side facing the roadway. In two-lane roads the center line is marked by knobs of polymethacrylate resin or metal knobs formed with light slots. They may also be incorporated in coloured center strip elements. It is also possible to illuminate the entire road raft from the underground duct system, where the lighting installation may also serve for heating. The lighting serves only to illuminate the road surface and to afford better visibility and safety in the case of fog. The light of the vehicles is not affected by this lighting and glare is precluded. The lighting installation may have to be used only in the case of fog. Power is supplied to the lighting fixtures by a low-voltage system by means of cables extending through the cable slots formed in the road elements. Terminal boxes are incorporated in the inspection wells, from where the electric installation can be checked and where specially designed remotely controlled devices for cleaning and for thawing snow and ice can be connected. These remotely controlled devices move through the ducts from well to well. All parts of the road raft are designed to enable a replacement of elements at any time in the case of partial damage or when required for other reasons. In the case of highways the drain slots are generally 2 cm. wide whereas in cities, towns or villages the drain slots taper towards a width of 8 mm. at the surface.

The raft described hereinbefore may also be used as a runway for aircraft. The runway can be illuminated from the underground duct system and forms at night an illuminated pattern which can easily be seen from above and greatly facilitates the landing operation. This lighting installation serves at the same time as a heating system in the runway raft.

With the above and other objects in view which will become apparent from the detailed description below, a preferred construction of the structural assembly is shown in the drawings in which:

FIGURE 1 is a side elevational view of one beam wherein dovetailed cavities are provided for the connectors.

FIGURE 2 is a similar view of the adjacent beam wherein the projections or extensions are provided which will cooperate with the cavities shown in FIGURE 1.

FIGURE 3 is a top plan view of FIGURE 1.

FIGURE 4 is a top plan view of FIGURE 2.

FIGURE 5 is an enlarged view of a part of the structure shown in FIGURE 1.

FIGURE 6 is an enlarged partial view of the structure shown in FIGURE 2.

FIGURE 7 is a partial cross-sectional view through a plurality of beams illustrating one type of spacing between said beams.

FIGURE 8 is a similar view to FIGURE 7 wherein the spacing between the beams is tapered towards the top.

FIGURE 9 is a similar view to FIGURE 7 illustrating the spacing between the beams tapered towards the top and towards the bottom.

FIGURE 10 is an enlarged partial plan view of the structure shown in FIGURE 3.

FIGURE 11 is a similar view of the structure shown in FIGURE 4.

FIGURE 12 is a top plan view of a beam containing the cavities of tapered construction so as to take care of curves.

FIGURE 13 is a similar view of a tapered beam to cooperate with the beam of FIGURE 12 wherein such beam is also tapered so that a curvature of the tread surface may be provided.

FIGURE 14 is a plan view of an assembly of beams using the beams shown in FIGURES 12 and 13.

FIGURE 15 is a cross-sectional view through a plurality of beams illustrating particularly the manner in which fluorescent tubes or lighting fixtures may be incorporated in the assembly of beams.

FIGURE 16 is a partial elevational view illustrating the joints for connecting two assemblies of beams.

FIGURE 17 is a cross-sectional view showing particularly the median strip between two roadways and the lighting systems provided therefor.

FIGURE 18 is a top plan view of the construction shown in FIGURE 17.

FIGURE 19 is a view similar to FIGURE 17 wherein a center strip element of yellow or white color may be incorporated.

FIGURE 20 is a plan view of the construction shown in FIGURE 19.

Figure 21:
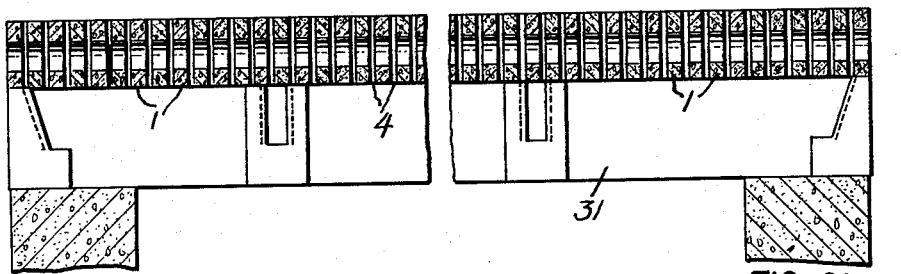
FIGURE 21 is a cross-sectional and part elevational view showing the invention applied to a bridge.

Explanations with reference to the drawings:

The road raft is assembled from two different elements or two different compound beams as is apparent from FIGS. 1, 2, 3 and 4 of the drawing. These beam elements as well as edge beams or center strip elements and other parts are prefabricated preferably from high-grade concrete with appropriate reinforcements. The dimensions are standardized in accordance with the width of the road, the beams being 3.50 meters long for one- or two-lane superhighways, see FIGS. 1, 2, 3, 4 and 14.

Two such beams make the two-lane road 7 meters wide. The elements can also be manufactured in a width of 7 meters and placed without central joint. Special elements are made for the curves in accordance with the curvature thereof, see FIGS. 12, 13 and 14. These beams are of the same shape as the others but tapered. The beams are preferably 25 centimeters high and their width is 6 centimeters and at the connector extensions 10 centimeters, see FIGS. 1, 2, 3 and 4. The interengagement with the next beam results in a drain slot of 8 centimeters. The drainage slot is 2 centimeters wide, see FIGS. 7 and 14 and numeral 4. In roads in cities, towns and villages the drain slot is constricted at the top to 8 millimeters, see FIGS. 8, 9 and numeral 4. The intermediate joints are dovetail-shaped, see numerals 2, 3 and 2′, whereas oblique mortise joints are provided at the edges, see FIGS. 1, 2, 3, 4, 5, 6, 10 and 11. The joints for the second lane are also apparent from the above-mentioned drawings and from FIGS. 16 and 17. In two-lane road rafts resting on strip foundations a center strip element of yellow or white color may be incorporated, see FIGS. 18 and 19.

The compound beam elements are arranged to interengage and held against displacement, tilting and rising and to define drain slots. The joints and slots are arranged in an exact geometrical pattern, see FIG. 14, numerals 1 and 4. The eight circular openings in the beams are preferably 125 mm. in diameter, see FIGS. 1, 2 and numeral 5. These openings form in the road raft the drain ducts discharging into the drain and cleaning wells. These drain ducts may be cleaned when required from well to well by flushing or by means of remotely controlled devices. Likewise, the remotely controlled heating device is located through these openings when there is ice or snow in them. Fluorescent tubes or lighting fixtures may also be incorporated in these ducts if required and serve also for heating in winter. In the 30-millimeter openings, see FIGS. 1, 2, 5, 6 and 15 and numeral 7 the cables for the lighting are arranged. The vertical circular slots 20 mm. in diameter and extending upwardly from the cable slot in the beams serve for the light connection and as plugs for the edge beams or border stones, see FIGS. 5, 6, 15, 16 and 18.

The road edge beams or border beams 8 are preferably 14 centimeters wide, 12 centimeters high and 3.56 meters long and are connected by an oblique scarf joint, see FIGS. 15, 16, 18, downwardly anchored in the road raft by bolts and laterally secured. The edge or border beam 8 is formed with light slots 52 centimeters x 4 centimeters, which are glazed in front at 11. The slot widens rearwardly so that the tubular lamps 10 with fittings can easily be accommodated. Current is supplied through small tubular ducts formed in the beams. The edge beams are also formed with spaced openings 9 for the insertion of snow rods or edge rods, FIGS. 16 and 18.

In two-lane roads the center line is illuminated by light knobs of metal 12 having lateral slots 11′ or by knobs of polymethacrylate resin, see FIG. 19, and lamps 10′. As with the edge beams the current is fed through the cable slots in the road raft. The lamps are mounted on beams. Where colored center strip elements 8′ are used for marking the center line the light knobs 12 are incorporated in these beams. The center beams are 28 centimeters wide and 18 centimeters high, 3.56 meters long, mitered and anchored like the edge beams.

Construction of carrying structures, such as bridges, floors and girders from prefabricated beams comprising two kinds of elements may also be accomplished.

The carrying structures, bridges, floors and girders constructed according to the invention are characterized in that they are assembled from a plurality of compound beams comprising two kinds of elements.

The carrying structures may be placed in any desired width on supports, foundations, walls and piers as prefabricated elements. The beams are arranged to interengage and to be held against displacement and tilting. The joints are oblique mortise joints at the ends whereas the intermediate joints are of dovetail shape.

Carrying structures consisting of compound beams are particularly suitable for the construction of road bridges. The bridge can be erected within a very short time because with the exception of the foundations it consists only of prefabricated parts which can be quickly assembled. The road raft can be placed directly on the carrying structure 31 of the bridge. The bridge or the road on the bridge is immediately ready for use after its quick assembly. Any formwork, propping and setting times are eliminated. If this bridge assembled from prefabricated parts was used as an emergency bridge it can easily be dismantled without damage. For instance, the compound beams for a bridge 16 meters long do not weigh more than about 3400 kilograms. This weight can easily be carried and lifted by relatively light lifting equipment. When some bridge elements have been placed the next ones can be rolled over them. In the case of smaller passages of small width the bridges may even be assembled by hand.

Figure 22:
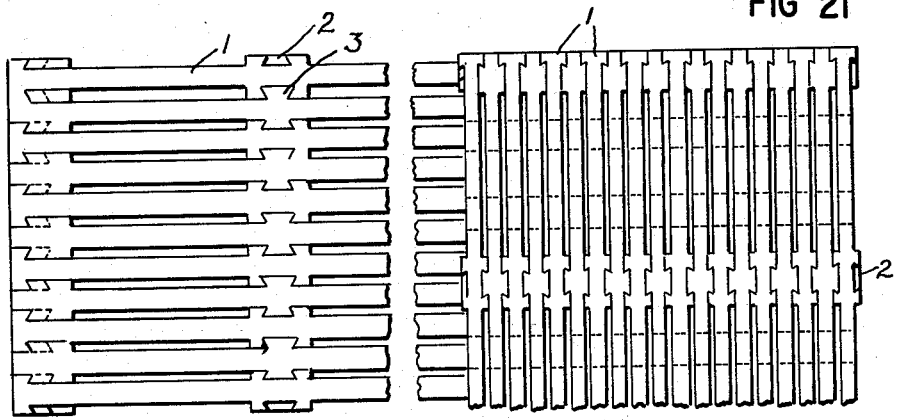
FIGURE 22 is a plan view of the structure shown in FIGURE 21.
Figure 23:
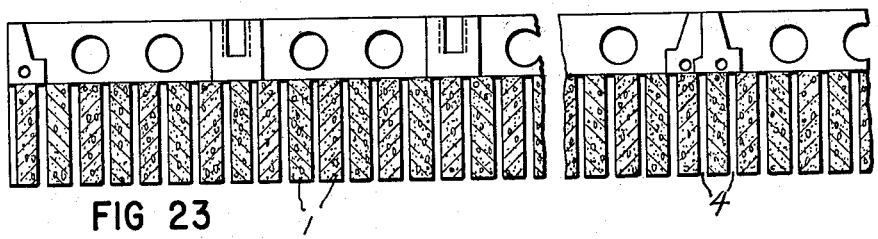
FIGURE 23 is a cross-sectional view on a larger scale of the structure shown in FIGURE 21.

The carrying structures are assembled from two kinds of beam elements, see FIGS. 21, 22, and 23. These bridge compound beams are prefabricated from high-grade concrete with an appropriate reinforcement. The height of the carrying structures and the widths of the beams will depend on the spans and loads. The height and width of the beams are determined in dependence on the static requirements, as well as the number of compound joints. The width of the beams preferably does not exceed 12 centimeters and at the connector extensions 20 centimeters, as a rule.

The girders and topping beams are assembled from prefabricated elements or beams and the individual parts can easily be carried and assembled on the site. The width of the girder will determine the number of compound beams. The height of the compound beams and of the girder will be statically determined.

The construction is the same as for compound beams for bridges, see FIGS. 21 and 22 of the drawing.

Figure 24:
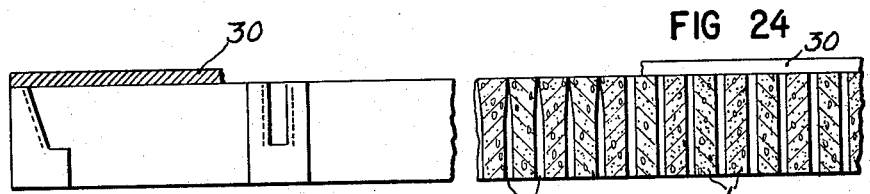
FIGURE 24 is a part elevational and part cross-sectional view of compound beams such as used for the floors of industrial buildings.

Floors for industrial buildings have compound beams arranged closely one beside the other and are particularly suitable for heavy loads. These floors can be loaded immediately after they have been placed and do not require a concrete topping nor propping. The compound beams are made to close the clearances at the top or cover planks 30 are placed over the compound beam, FIG. 24. In other respects the manufacture and construction is the same as with the bridges and topping beams.

The use of the compound is also suitable for making coffered floors according to the invention.

For above-ground buildings, up to a live load of 500 kg./sq.m. and up to spans of 7 meters. The coffered floor is composed of longitudinal compound beams spaced 40–80 centimeters apart and of transverse beams spaced the same or a wider distance apart and inserted into the connector grooves of the longitudinal beams to form square or rectangular coffers. Cover planks extending over several beams or square cover plates on each coffer area are placed on these coffer compound beams. The cover planks or plates are mitered and by dovetail-shaped scarfed joints are held against displacement. The underside of the floor structure may be lined with lath of any kind and provided with coarse and fine plaster layers. Eyes or anchoring holes are provided in the beams for securing the lath. The underside may remain entirely free to expose the coffered structure.

For sound insulation the floor beams are provided with a covering consisting of the excelsior-magnesite composition sold under the trademark Heraklith or of another sound insulating material. In other cases Heraklith plates can be placed as a heat or sound insulation directly on the coffer beams, whereas the cover planks are placed on the Heraklith plates. The underside may retain the coffered design. The beams being neat, the underside of the Heraklith plates may be left in natural condition or may be plastered. This floor has the advantage that it can easily be placed without formwork or propping and without any topping concrete and can immediately be walked upon and loaded. Likewise, the floor covering of rubber, linoleum etc. can be placed directly on the cover planks so that the usual packed underlayer is not necessary. The floor can be dismantled at any time without damage unless the supports are gripped.

Figure 25:
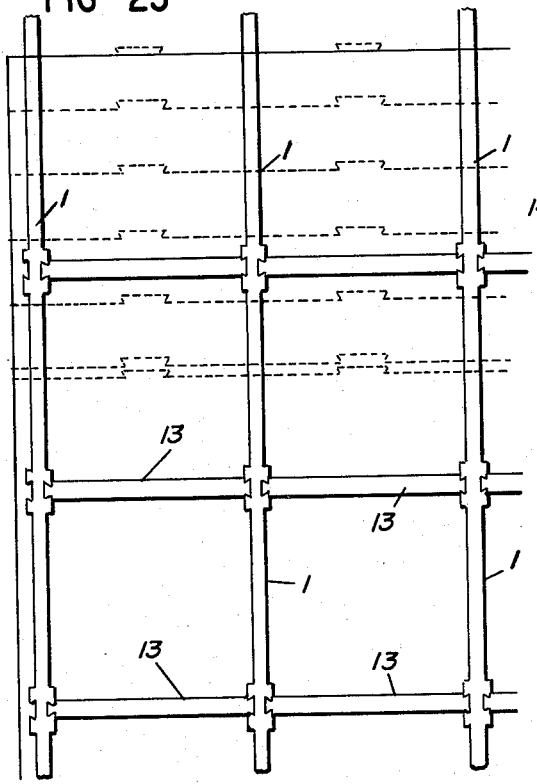
FIGURE 25 is a plan view illustrating the use of the invention to construct a coffered floor.
Figure 26:
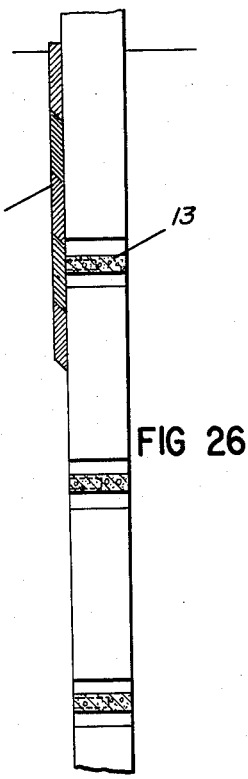
FIGURE 26 is a partial cross-sectional view of the structure shown in FIGURE 25.
Figure 27:
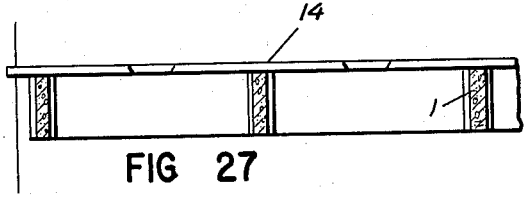
FIGURE 27 is a cross-sectional view of the structure shown in FIGURE 25 taken at right angles to the view in FIGURE 26.
Figure 28:
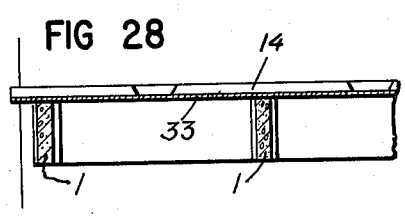
FIGURE 28 is a cross-sectional view of the structure shown in FIGURE 25 illustrating the closing of one side by a lath or plaster.
Figure 29:
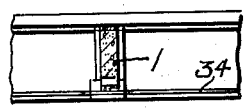
FIGURE 29 is a cross-sectional view of a detail.

The coffered floor is made from compound beams placed individually with a spacing of 40–80 centimeters from support to support. Transverse beams spaced the same or a wider distance apart are inserted in the connector grooves of the longitudinal beams so that square or rectangular coffers are formed, see FIGS. 25, 26, 27, numerals 1 and 13. The transverse compound beams and the cover planks or plates 14 are prefabricated from high-grade concrete with an appropriate reinforcement. The height of the compound beams and transverse compound beams is 25 centimeters, as a rule. The width of the beams is preferably 6–8 centimeters, at the connector extensions 10–12 centimeters. The cover planks 14 are 25 centimeters wide and 4 centimeters thick, as a rule, their length is 80–240 centimeters, depending on the spacing of the beams, see FIGS. 25, 26 and 27. The cover plates are rectangular or square in conformity to the coffer. The cover planks and plates are mitered and held against displacement by dovetail-shaped joints, see FIGS. 25, 26, 27. The underside remains either open or is closed by a lath 34 and plastered, see FIGS. 27, 28 and 29. The lath 33 in FIG. 28 is affixed to the eyelets or anchoring holes provided at the compound beams.

What I claim is:

1. A structural assembly for forming carrying lattice structures and tread surfaces, comprising a plurality of beams arranged on edge and approximately on the same level having laterally protruding connectors at their ends and at points spaced along the length of said beams, said connectors comprising open-topped cavities on alternate beams, a supporting edge face extending laterally of the beam forming the bottom wall of said cavities, the beams located intermediate said alternate beams having projections thereon interfitting with said cavities to form a carrying structure and said connectors spacing said beams from one another slightly.

2. A structural element as set forth in claim 1 wherein said cavities and said projections are wedge shaped.

3. A structural element as set forth in claim 1 wherein the ends of said beams are provided with cooperating projections and recesses.

4. A structural element as set forth in claim 1 wherein said beams are provided with transverse holes which extend coaxially transversely of said beam to form sewers and conduit ducts.

5. A structural element as set forth in claim 1 wherein said beams taper in their longitudinal direction so that a curvature may be imparted to the structure.

6. A structural element as set forth in claim 1 wherein said beams are connected at their ends by an edge beam.

7. A structural element as set forth in claim 6 wherein lighting means are provided in said edge beam, and said edge beam is provided with slots through which the light may be emitted.

References Cited in the file of this patent

UNITED STATES PATENTS

| | | |
|---|---|---|
| 61,580 | Tarr | Jan. 29, 1867 |
| 70,076 | Dean | Oct. 22, 1867 |
| 114,895 | Willet | May 16, 1871 |
| 223,431 | Bremerkamp | Jan. 13, 1880 |
| 369,478 | Snow | Sept. 6, 1887 |
| 400,013 | Steinburg | Mar. 19, 1889 |
| 1,065,231 | Finger | June 17, 1913 |
| 1,116,857 | Stevens | Nov. 10, 1914 |
| 1,207,738 | Fraley | Dec. 12, 1916 |
| 1,431,969 | Magrady | Oct. 17, 1922 |
| 1,898,297 | Fox | Feb. 21, 1933 |
| 2,135,400 | Johnson | Nov. 1, 1938 |
| 2,199,700 | Gramelspacher | May 7, 1940 |
| 2,503,574 | Allen | Apr. 11, 1950 |
| 2,618,469 | Mayer | Nov. 18, 1952 |